Jan. 1, 1957  J. B. WELCH  2,776,362
MAGNETIC FORCE RESISTANCE WELDING MACHINE
Filed June 15, 1953  2 Sheets-Sheet 1

Inventor
Jerome B. Welch
By W. E. Lyon
Attorney

Jan. 1, 1957    J. B. WELCH    2,776,362
MAGNETIC FORCE RESISTANCE WELDING MACHINE
Filed June 15, 1953    2 Sheets-Sheet 2
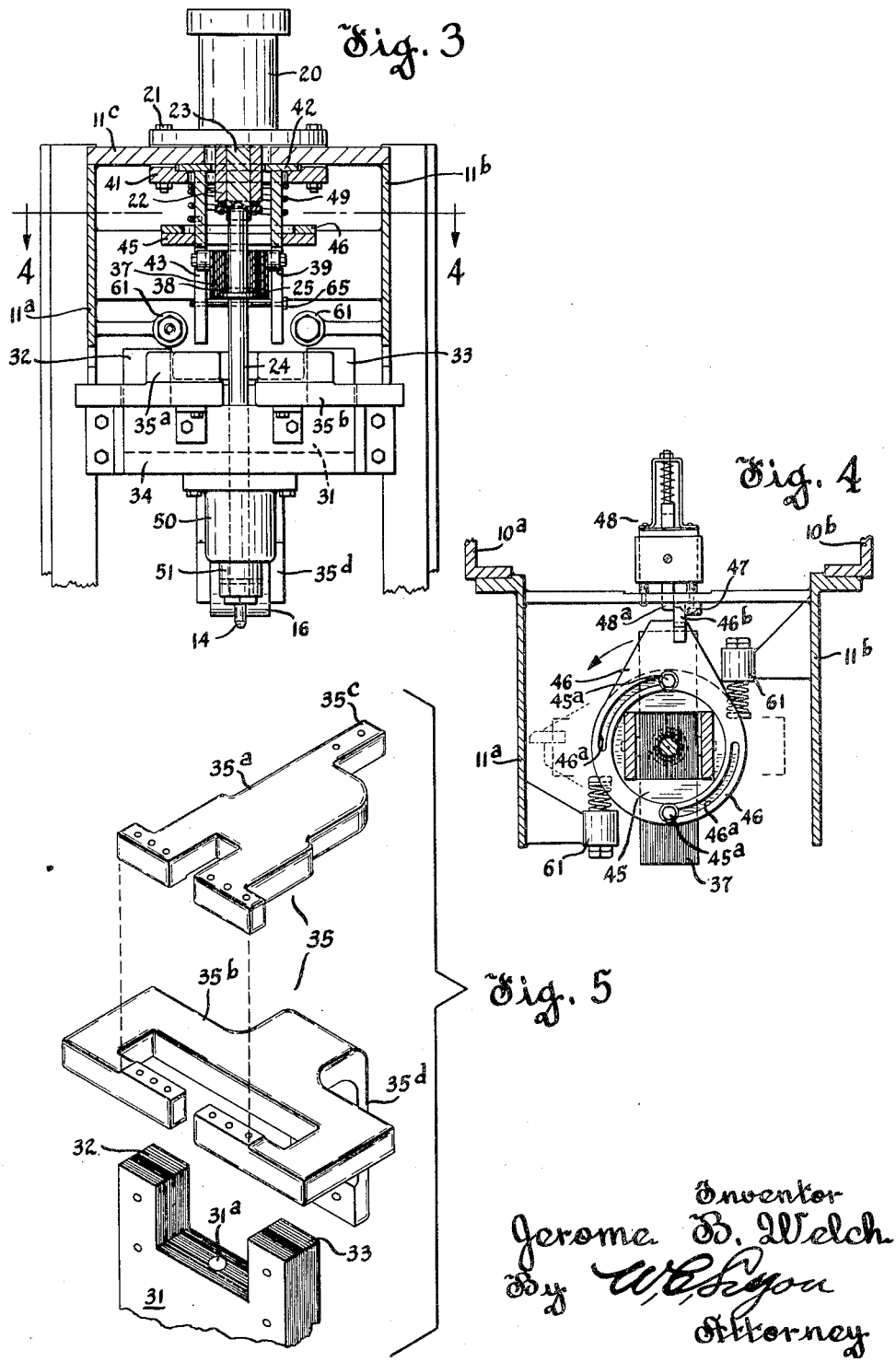
Inventor
Jerome B. Welch
By W. E. Lyon
Attorney United States Patent Office 2,776,362
Patented Jan. 1, 1957

2,776,362
MAGNETIC FORCE RESISTANCE WELDING MACHINE

Jerome B. Welch, Wauwatosa, Wis., assignor to Cutler-Hammer, Inc., Milwaukee, Wis., a corporation of Delaware Application June 15, 1953, Serial No. 361,587

13 Claims. (Cl. 219—86)

This invention is generally related to electric resistance welding machines and more particularly to an improved magnetic force resistance welding machine.

Because of the wide variations encountered in resistance welding materials of different type and thickness, prior art resistance welding machines have been considerably limited in their scope of application. For example, a welding machine suitable for resistance welding ferrous metals was probably not suitable for welding non-ferrous metals, and vice versa. Or, for example, magnetic force welding machines which because of their inherent fast follow-through produced excellent welds with materials having a relatively low melting point have not been satisfactory for certain high-conductivity materials which require the increased heating effect of the high resistance occasioned by low initial pressure between the electrodes.

Commercially available magnetic force welding machines have also been subject to the shortcoming that they did not permit the use of alternating current in the secondary or welding circuit. Severe arcing between the electrodes and "spitting" of the molten metal from the interfaces occurred whenever a welding current having a sine wave was used, thereby necessitating the use of single-phase half-wave welding current or, where heavier gage stock was to be welded, the use of polyphase half-wave welding current, both of which required control panels much more expensive than those ordinarily required in the non-magnetic or bench welders using full-wave current in the welding circuit.

Thus, it is an object of my invention to provide an improved electric resistance welding machine which is particularly suitable for welding both ferrous and non-ferrous materials.

It is also an object of my invention to provide an improved electric welding machine which readily may be used as either a straight fluid pressure force or as a combined magnetic force welder without interchanging of parts.

Another object of my invention is to provide in a magnetic force welder improved means for varying the point in the welding cycle at which the full magnetic force is applied.

It is also an object of my invention to provide novel and improved means for varying the magnitude of the electrode force in magnetic force welders.

It is another object of my invention to provide an improved magnetic force welding machine which permits the use of either full-wave or half-wave current in the welding circuit.

Other objects and advantages of my invention will hereinafter readily appear to those skilled in the art.

Referring to the accompanying drawings in which like reference characters indicate the same or similar elements:

Fig. 3 is a fragmentary, partly-sectioned, view; taken along line 3—3 of Fig. 1, showing in more detail the upper movable electrode assembly;

Fig. 4 is a fragmentary sectional view taken along line 4—4 of Fig. 3 and shows in detail the novel means for varying the magnetic force characteristics; and Fig. 5 is an exploded perspective view of the electromagnet core and winding members.

Figure 1:
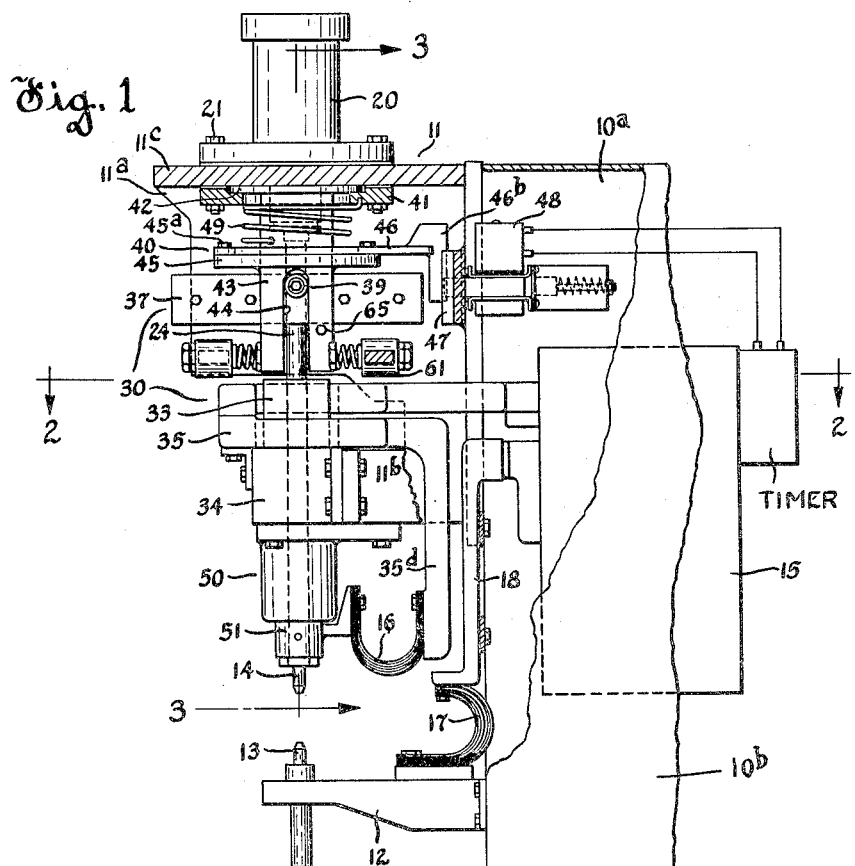
Figure 1 is a partly-sectioned, partly-schematic, side elevational view of a welding machine incorporating the features of my invention.

Now referring more particularly to Figs. 1, 3 and 4 of the drawings, it will be seen that my improved electric welding machine includes a main frame 10 having an overhanging frame portion 11 and a knee portion 12 on which is adjustably mounted a stationary electrode 13. The frame 10 is preferably made of steel so as to withstand the large forces involved and includes vertical side members $10^a$ and $10^b$ between which is positioned the welding current transformer 15 so as to keep the welding circuit leads as short as possible. (The details of the transformer are not shown inasmuch as it may be of any type suitable for spot or projection welding.)

Supported by and within the overhanging frame portion 11, the upper movable electrode assembly includes a double-acting ram 20, an electromagnet core and armature assembly 30, an armature guide assembly 40 and a quill type electrode ram assembly 50.

The double-acting ram 20 may be of any conventional type having a piston which is operated in both axial directions by means of fluid pressure. It may be secured to the top supporting plate $11^c$ by bolts 21 having a threaded connection with said plate, or by any other suitable securing means, and includes a depending piston rod 22 having a threaded socket portion 23 at its lower end.

A connecting rod 24 provides the necessary driving connection with the movable electrode 14. It preferably is made of stainless steel or other non-inductive material and is secured at its upper end to the socket portion 23 of the piston rod 22 and at its lower end to the movable electrode quill 51. A collar portion 25 is provided near the upper end for receiving the thrust provided by the electromagnet assembly 30, movement of the connecting rod being limited to an axial direction by means of the quill type electrode ram assembly, the details of which are not shown but are well known to those skilled in the art.

The magnetic force means comprises an electromagnetic core 31, a winding 35 and an armature member 37. The core 31 is a laminated U-shaped member formed of soft iron or other material which will assure quick attraction and release of the associated armature member. A centrally located opening $31^a$ is provided to permit free movement of the connecting rod 24 therethrough. Rigid support for the magnet core is provided by a clamp type bracket 34 which is suitably secured to the side portions $11^a$, $11^b$ of the welding machine frame and permits the pole portions 32, 33 to project upwardly, as shown in Fig. 3.

Although heretofore it was thought that the arcing and spitting at the electrodes was caused solely by the loss of magnetic pressure when the welding current went through zero, I have discovered that the difficulties were due primarily to the fact that the electromagnet core was unequally energized. This resulted in a canting or tilting of the armature member which relaxed the electrode pressure after the initial impact at a time when the pressure was most needed. My improved magnet winding 35 avoids this difficulty by insuring equality of flux at both ends of the armature and, in cooperation with the electrode force afforded by the fluid pressure actuated ram 20, provides excellent welds with either alternating or direct current in the secondary welding circuit. That a machine of this construction is of a more universal character and more economical to manufacture will readily appear to those skilled in the art. Although the electrode pressure will to some extent vary with the magnitude of the current in the welding circuit, at no time will it be less than the predetermined minimum determined by the fluid pressure in the cylinder 20.

Figure 2:
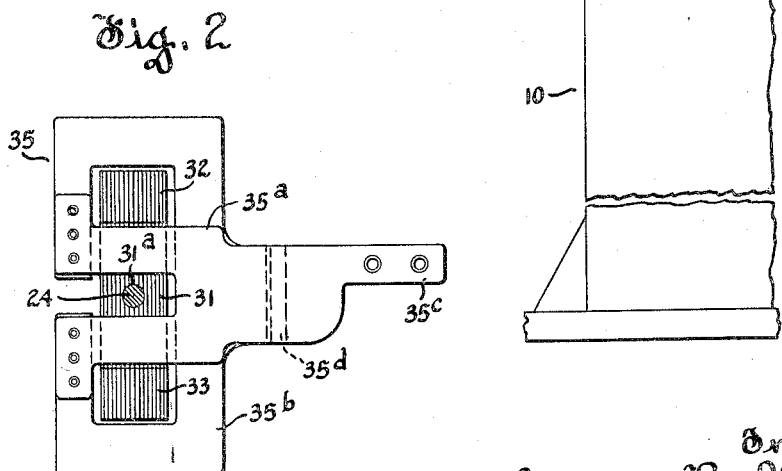
Fig. 2 is a fragmentary view taken along line 2—2 of Fig. 1 and shows the manner in which the magnet winding is split to surround each leg of the U-shaped magnet core member.

As best shown in Figs. 2 and 5, my novel and improved winding for magnetic force welding machines includes a first bifurcated cast metal member 35$^a$ having an extension 35$^c$ for direct connection to the welding transformer, and a second bifurcated cast metal member 35$^b$ having a downwardly extending portion 35$^d$ which may be electrically connected to the movable electrode 14 by means of a flexible conductor 16. The bifurcations on the winding member 35$^a$ have outwardly extending portions which are adapted to engage corresponding inwardly extending portions on the winding member 35$^b$ and are secured thereto by bolts or other suitable means assuring good electrical connection therebetween. When properly assembled together with the core member 31, the two winding members provide a two-pole electromagnet having two half-turns in the same electrical direction whereby the flux will flow from one pole face to the other. The equally divided and similarly positioned half-turns also provide a flux which is of equal intensity at both poles and insures a uniform attraction of the associated armature member. The necessity of providing an equal attractive force at both poles is of particular importance because, as aforementioned, I have found that the difficulties encountered in prior art welding machines, when an alternating welding current was used, were occasioned by an unequal flux at the magnet pole faces which caused a canting of the armature. In consequence thereof, there occurred an armature bounce which resulted in a complete or almost complete loss of electrode pressure. This difficulty has been completely eliminated by my improved arrangement which insures that the minimum force exerted on the movable electrode will at no time be less than that provided by the fluid actuated ram. In consequence thereof, by regulating the pressure in the ram so as to provide at least the minimum electrode force necessary to avoid spitting and arcing, the advantages of electromagnetic force may be obtained without regard to the type of welding current used.

The welding circuit in my improved welding machine will be readily understood. It extends from the transformer 15, Fig. 1, thence between the magnet poles 32, 33, around the outside of each of said poles, down to the flexible conductor 16, through the movable electrode 14 and the workpiece (not shown), through the stationary electrode 13, thence through the flexible conductor 17 which is connected to the electrode 13 by means not shown, and back to the transformer through another cast copper conductor 18, Fig. 1. By reason of this arrangement it will be seen that the electromagnet 35 is energized whenever current flows between the welding electrodes, the flux at all times being proportional to the current flow.

The rectangular armature 37, Figs. 1 and 3, which cooperates with the magnet core 31 is also centrally apertured to permit free movement of the connecting rod 24 therethrough. The opening is enlarged at the lower side to receive a roller type thrust bearing 38 (Fig. 3) which is adapted to cooperate with the collar 25 on the connecting rod 24 to transmit magnetic force thereto and also to permit said armature to freely revolve on said collar. This arrangement permits free axial movement of the movable electrode 14 when said armature is locked in its upper position and also permits the armature to revolve about the connecting rod 24 under the influence of the magnet core structure without affecting the driving connection with said rod. The advantages of a freely rotatable armature which does not necessarily move with its associated connecting rod will hereinafter be explained. A pair of oppositely-disposed centrally-positioned cam followers 39 are also suitably secured to the armature 37 to afford when desired restraint against radial movement without limiting reciprocal movements thereof.

The adjustable armature guide assembly 40 is rotatably supported by a bearing collar 41 which is secured to the bottom side of the frame plate 11$^c$ in such manner that the guide fork 43 may conveniently be clamped in a given position or permitted to freely rotate. This may be readily accomplished by mounting the bearing collar 41 on threaded studs carrying nuts by means of which said collar may be raised to clamp the adjusting fork supporting ring 42 against the frame plate 11$^c$ whenever it is so desired. The two parallelly disposed fork members 43 depend from the supporting ring 42 to permit vertical movement of the armature 37 therebetween. Each has a vertical guide slot 44, Fig. 1, for receiving the aforementioned cam followers 39 to prevent relative rotational movement between said fork and said armature. It thus will be seen that by clamping the guide fork 43 in any given position the path of movement of the armature 37 will be limited to a single vertical plane. If the vertical plane selected is at right angles to the magnet core, the gap between the armature and the magnet pole faces 32, 33 will be at its maximum, resulting in the minimum attractive force between the magnet and its armature. However, if the armature 37 is permitted to move in a plane parallel to the magnet pole faces, the magnet gap will be at its minimum and the attractive force at its maximum. Consequently, the amount of magnetic force exerted on the movable electrode 14 may be varied with heretofore unknown facility by the simple expedient of rotating and reclamping the guide fork 43. A further variation in the maximum magnetic force obtained may be effected by adjusting the height of the electrode 13 so as to vary the minimum vertical gap between the armature and the magnet.

Although magnetic force resistance welding machines have provided the fast movable electrode follow-through which is necessary to satisfactorily weld non-ferrous materials having when heated a tendency to go directly from a solid to a liquid state, and thus fulfilled a long-felt need in the art, it often happens that the follow-through is too fast. For example, in the case of certain high-conductivity materials, such as silver, it is often beneficial to maintain for a cycle or two the relatively low initial electrode pressure provided by the fluid pressure actuated ram alone, thereby obtaining the increased heating effect of the high resistance occasioned by low contact pressure. This increased heating effect provides welds of larger area without requiring larger currents, and thus provides a much more efficient welding machine.

Accordingly, I have found that the aforedescribed welding machine may be further improved by incorporating therein means for delaying or limiting the amount of magnetic force applied to the movable electrode until some preselected point in the welding cycle, at which point the full magnetic force is permitted to be applied. As best shown in Figs. 1 and 4, this means may comprise a latching arrangement for restraining rotational movement of the magnet armature member 37. A rectangularly apertured clamping plate 45 is suitably secured to the guide fork 43 at a level somewhat above the highest point of elevation of the magnet armature and includes a pair of oppositely disposed clamping bolts 45$^a$. Movably mounted on said clamping plate is an adjustable keeper ring 46 having two arcuate slots 46$^a$ which contain the shanks of the clamping bolts 45$^a$ and permit movement with respect thereto through an arc of 90 degrees. The ring 46 further includes a depending portion 46$^b$ adapted to engage a fixed stop member 47 and be held thereagainst by a solenoid releasable latch 48$^a$. Said latch is part of a conventional spring-biased solenoid 48 fixedly mounted on the frame 10 and is adapted to restrain said keeper ring against rotary movement until released therefrom by the solenoid winding (not shown), the energization of which is controlled by any suitable timer mechanism which will actuate the solenoid at a preselected instant after initiation of the welding current. A torsion spring 49 is connected to provide the biasing force necessary for returning said keeper ring to latch engaging position after movement therefrom. It thus will be seen that by loosening the bearing collar 41 to permit free rotary movement of the armature assembly and by clamping the keeper ring 46 to the clamping plate 45, the magnet armature 37 may be limited for movement in only a fixed vertical plane until such time as the latch 48ᵃ is released, at which time the armature will be pulled into alinement with the magnet pole faces by the magnetic flux therebetween. (See dotted lines in Fig. 4.) When the welding current stops and the magnetic flux decays, the armature will then return to the latched position under the bias of the torsion spring 49.

Although I have shown my keeper ring 46 as mounted on the guide fork 43, it should be understood that in magnetic force welding machines not incorporating a guide fork or its equivalent I contemplate mounting the keeper ring directly on the rotatable armature, in which case it will move vertically with the armature, maintaining engagement with the solenoid latch by means of the extended downwardly depending portion 46ᵇ, Fig. 1.

Because of the relatively high inertia of the armature 37 there is a tendency for it to swing past the point of alinement with the magnet, and thereby effect a slight reduction in the electrode pressure. This difficulty may be overcome by mounting spring-loaded stops 61 on the frame side supports 11ᵃ, 11ᵇ, so as to engage and resist further rotary movement of the armature when it is in alignment with the magnet core 31.

It thus will be seen that an armature latching arrangement such as that above-described will permit a wide variation in the electrode force characteristics. While the armature is latched against rotary movement the electrode force will be the sum of the force provided by the pressure cylinder 20 and the relatively low magnetic force obtained by the relatively wide gap between the armature and magnet. However, upon release of the latch, the electrode force will abruptly rise as the armature swings to the position of minimum gap, the electrode force then becoming the sum of the cylinder force and the full magnetic force afforded by the current in the welding circuit at that instant. A person skilled in electric welding will readily see that there is thus provided a unique and advantageous means for further varying the electrode force characteristics of magnetic force welding machines to meet the requirements of various conditions.

For those occasions where it might be desirable not to apply magnetic force to the electrode and to use only the force provided by the cylinder 20, I have provided means for locking the magnet armature 37 in an inoperative position so that the electrode connecting rod 24 may move independently thereof. A pin 65 may be inserted in suitably positioned openings in the guide fork 43 so as to hold the armature in its upper position. The connecting rod 24 and its associated movable electrode 14 will then move independently of the armature, said pin 65 being sufficiently strong to resist any attractive force which might exist between the magnet and armature. It thus will be seen that my improved magnetic force welder may simply and readily be converted to a conventional non-magnetic welding machine and vice versa, a feature which is of particular advantage to those who have a wide variety of welding work to be done. When used as a bench welder, as above-described, the electrode pressure will at all times be determined solely by the fluid pressure in the cylinder 20. However, when the pin 65 is removed from the guide fork 43, the electrode pressure will at all times be the sum of the cylinder force and the instantaneous magnetic force.

The operation of that embodiment of my invention herein illustrated and described will now be explained. If the materials to be welded do not require the welding characteristics afforded by the armature latching arrangement, the setup and operation of the machine is very simple. After determining the degree of magnetic force required and then clamping the adjusting fork 43 in that angular position which provides the magnetic gap corresponding to the force required, remove the pin 65 so as to permit the armature 37 to move downwardly with the connecting rod 24. Then insert the parts to be welded between the electrodes and apply fluid pressure to the cylinder 20 to force the electrodes and workpieces together. The welding current in the secondary or welding circuit of the transformer 15 may then be initiated and terminated by any suitable means; for example, by an electronic timer (see Fig. 1) which controls the duration of the flow of welding current and consequently the total energy supplied to the weld. As the welding current flows through the electromagnet winding 35 a flux proportional to the instantaneous current value will be induced in the magnet poles 32 and 33 and attract the armature 37 with a force which is also proportional to the magnetic gap therebetween. This magnetic force will in turn be transmitted to the movable electrode 14 through the thrust connection with the connecting rod 24 to supplement for the duration of the welding current the electrode force already provided by the fluid pressure ram 20, the guide fork 43 serving to overcome any torque exerted on the armature by reason of the lateral displacement between said armature and said magnet pole faces. After the welding current has been terminated and the weld completed, the movable electrode and armature are returned to the upper position by the ram 20.

The operation is somewhat modified when it is desired to delay application of the magnetic force. The bearing ring 41 is then loosened to permit the armature 37 to freely revolve about the connecting rod 24. The keeper ring member 46 is clamped to the guide fork or armature at that angular position which gives the desired magnetic gap when the keeper ring is latched. It is also necessary to adjust the welding current timer so as to energize the solenoid latch 48 at the desired point in the welding cycle. The welding operation is then performed in much the same way as before described except that the magnetic force exerted on the electrodes will be kept at a preselected minimum until the keeper member 46 is released by the latch 48. As best shown in Fig. 4, the armature 37 will then move into parallel relationship with the magnet core 31 to exert the maximum magnetic force for the current in the welding circuit at that instant. The sudden application of the additional magnetic force in this manner provides an effect very much like a hammer blow which coins the welded material to give a desirable homogeneity to the fused mass.

While I have shown and described my invention as applied to only a single embodiment of an electric resistance welding machine, it will be obvious to those skilled in the art that many changes and modifications may be made without departing from the invention. I therefore intend that all such changes and modifications as fall within the true spirit and scope of my invention shall be covered in the appended claims.

I claim:

1. A magnetic force welding machine comprising, in combination, a fluid pressure actuated device; a movable electrode; a connecting rod providing a driving connection between said device and said electrode; a magnet core symmetrically disposed about said connecting rod and including a pair of pole portions positioned on opposite sides of said connecting rod; an energizing winding for said magnet core symmetrically disposed about said pole portions and said connecting rod; an elongated armature member having end portions for attraction by said pole portions; means providing a driving connection between said armature and said connecting rod, said means including means providing for rotary adjustment of said armature with respect to said magnet core whereby said members may be placed out of alinement with each other to vary the magnetic gap therebetween; rotatably mounted guide means cooperably associated with said armature; and means for locking said guide means against rotation, in any desired rotary position thereof, to limit said armature to movement in a single plane and to effect a proportional variation in said magnetic gap with a consequent variation in the magnetic force transmitted to said movable electrode.

2. A magnetic force welding machine comprising, in combination, a movable electrode; fluid pressure means including a connecting rod adapted to transmit a fluid pressure force to said movable electrode; an electromagnetic core member having a pair of pole portions disposed on opposite sides of said connecting rod; an energizing winding for said core including two parallel half-turns positioned for uniform magnetization of said pole portions; an armature member positioned for attraction by said pole portions; and means providing a driving connection between said armature and said connecting rod for supplementing the fluid pressure force supplied to said movable electrode by a magnetic force proportional to the degree of magnetization of said magnet core pole portions.

3. In a magnetic force welding machine comprising a plurality of relatively movable electrodes and mounting means therefor, in combination, a substantially U-shaped electromagnetic core having a pair of upwardly extending pole portions and an armature member cooperatively associated therewith for bodily attraction by said pole portions for transmitting a magnetically generated force to at least one electrode of said machine, an energizing winding for said electromagnetic core comprising a first conducting member having a pair of parallel leg portions adapted to pass between said pole portions, a second conducting member mounted beneath said first conducting member, said second conducting member including a pair of leg portions which respectively surround the outer sides of said pole portions, and means rigidly connecting the ends of the leg portions of each conducting member with the respectively associated ends of the leg portions of the other conducting member, said means insuring good electrical conduction between said conducting members.

4. In a magnetic force welding machine, in combination an electromagnet having a flux proportional to the instantaneous value of the welding current; an armature arranged for bodily attraction by said electromagnet and adapted for rotary movement in a plane parallel to said electromagnet to effect a variation in the magnetic flux therebetween; latch means adapted to restrain said armature against rotary movement under the influence of said electromagnet; preset timing control means for effecting release of said latch means at a pre-determined instant in the welding cycle; and biasing means connected to said armature for returning it to latched position after termination of the welding current.

5. In a magnetic force welding machine, in combination, an electromagnet having a flux proportional to the instantaneous value of the welding current; an armature arranged for bodily attraction by said electromagnet and adapted for rotary movement parallel to said electromagnet to effect a variance in the magnetic flux therebetween; latch means adapted to restrain said armature against rotary movement under the influence of said electromagnet; and control means for releasing said latch means at a predetermined instant in the welding cycle.

6. In a magnetic force welding machine, in combination, an electromagnet having a flux proportional to the current in the welding circuit, an armature adapted for normal bodily movement along a plane determined by said electromagnet flux; latch releasable means adapted to limit said armature to movement in a plane other than said normal plane for effecting a reduction in the flux flow between said armature and said electromagnet; and control means adapted to effect release of said latch releasable means at a preselected point of time in the welding cycle for permitting said armature under the influence of said flux to move into its normal plane of movement.

7. In combination with a magnetic force welding machine including an electromagnet and an associated armature member adapted for rotary movement with respect to said electromagnet, movement limiting means for said armature member comprising a guide member adapted for rotation with said armature member, a cam face on said guide member extending in a direction parallel to the desired path of movement of said armature member; cam follower means secured to said armature member and cooperable with said cam face for limiting movements of said armature to a direction parallel to said cam face; and means for locking said guide member against rotation with respect to said electromagnet whereby movement of said armature member under the influence of said electromagnet may be limited to a path established by said cam face for effecting a variation in the magnetic flux between said members.

8. In a magnetic force welding machine, in combination, an electromagnet; an armature arranged for transmitting a force to the welding electrodes of said machine under the influence of said electromagnet; manually operable means providing for rotary adjustment of said armature out of alinement with said electromagnet for effecting a variation in the degree of magnetic attraction therebetween; guide means rotatable to any one of a plurality of positions corresponding to the degree of magnetic attraction desired; means for preventing rotary movements of said armature relative to said guide means; and means for locking said guide means in any one of said plurality of positions whereby movements of said armature under the influence of said electromagnet may be limited to a single plane normal to said electromagnet.

9. In combination with a magnetic force welding machine including an electromagnet and a cooperating armature connected for transmitting a magnetic force to the welding electrodes of said machine, manually operable means providing for rotary adjustment of said armature with respect to said electromagnet; a guide fork associated with said armature for rotary movement therewith; cam means between said armature and said guide fork for preventing rotary movement therebetween; and means for locking said guide fork in any given position to limit reciprocating movement of said armature to a path determined by said guide fork.

10. In a magnetic force welding machine including an electromagnet and an armature associated therewith for transmitting a magnetic force to the welding electrodes, manually operable means providing for rotary adjustment of said armature throughout a preselected range with respect to said electromagnet to vary the magnetic flux therebetween; said last mentioned means including an adjustable keeper ring associated with said armature; and latch means cooperable with a portion of said keeper ring for preventing rotary movement of said armature for a preselected period of time.

11. In a magnetic force resistance welding machine comprising a plurality of relatively movable electrodes and mounting means therefor, in combination, an electromagnet including a core member having a plurality of pole faces, an armature member having a portion movable into an and out of flux inducing relationship with said pole faces, and manually adjustable guide means for said armature for limiting movement thereof about an axis perpendicular to said pole faces to any one of a plurality of planes, depending upon the amount of flux relationship manually preselected therefor, said armature having a positive driving connection with one of said electrodes.

12. In a magnetic force welding machine, in combination, an electromagnet; an armature member operably connected to one of the welding electrodes of said machine for transmitting a magnetic force thereto and arranged for magnetic attraction by said electromagnet; means providing for lateral displacement of the cooperating parts of said electromagnet and said armature with respect to each other for varying the degree of magnetic attraction therebetween; and rotatably adjustable guide means cooperable with said armature member for limiting reciprocating movements of the latter to any preselected one of a plurality of planes corresponding to the degree of magnetic attraction desired.

13. In a magnetic force welding machine, in combination, an electromagnet the winding of which is so connected in the welding circuit as to provide for said electromagnet a flux proportional to the instantaneous value of the welding current; an armature arranged for bodily attraction by said electromagnet and adapted for rotary movement in a plane parallel to said electromagnet to effect a variation in the magnetic flux therebetween; a spring biased latch normally adapted to restrain said armature against rotary movement upon energization of said electromagnet; electromagnetically operable means for effecting releasing movement of said latch after completion of a preselected portion of the welding cycle, for the purpose set forth; and means including a biasing spring associated with said armature for returning the latter to its latched position as an incident to termination of the welding current.

References Cited in the file of this patent

UNITED STATES PATENTS

| | | |
|---|---|---|
| 1,282,276 | Morris | Oct. 22, 1918 |
| 2,089,213 | Labodie | Aug. 10, 1937 |
| 2,246,167 | D'Entremont | June 17, 1941 |
| 2,338,974 | Schmidt | Jan. 11, 1944 |
| 2,386,261 | Redmond | Oct. 9, 1945 |
| 2,464,967 | Dinnick | Mar. 22, 1949 |
| 2,473,772 | Vang | June 21, 1949 |
| 2,497,652 | Bazley | Feb. 14, 1950 |
| 2,640,967 | MacGeorge | June 2, 1953 |
| 2,656,512 | Lenehan | Oct. 20, 1953 |